United States Patent
Henry et al.

(10) Patent No.: US 7,334,418 B2
(45) Date of Patent: Feb. 26, 2008

(54) METHOD AND APPARATUS FOR MICROPROCESSOR TEMPERATURE CONTROL

(75) Inventors: G. Glenn Henry, Austin, TX (US); Darius D. Gaskins, Austin, TX (US)

(73) Assignee: Via Technologies, Inc., Taipei (TW)

(*) Notice: Subject to any disclaimer, the term of this patent is extended or adjusted under 35 U.S.C. 154(b) by 264 days.

(21) Appl. No.: 10/825,737

(22) Filed: Apr. 16, 2004

(65) Prior Publication Data

US 2005/0178133 A1    Aug. 18, 2005

Related U.S. Application Data

(60) Provisional application No. 60/544,214, filed on Feb. 12, 2004.

(51) Int. Cl.
*F25D 17/04* (2006.01)
*B60H 1/32* (2006.01)
*H05K 7/20* (2006.01)

(52) U.S. Cl. .............. 62/186; 62/259.2; 165/104.33; 361/695; 361/697

(58) Field of Classification Search ........... 62/259.2, 62/186; 165/104.33; 361/695, 694, 697, 361/687, 703; 340/584
See application file for complete search history.

(56) References Cited

U.S. PATENT DOCUMENTS

| | | |
|---|---|---|
| 5,544,138 A | 8/1996 | Bajorek et al. |
| 5,557,557 A | 9/1996 | Frantz et al. |
| 5,719,800 A | 2/1998 | Mittal et al. |
| 5,815,724 A | 9/1998 | Mates |
| 5,926,641 A | 7/1999 | Shay |
| 5,996,083 A | 11/1999 | Gupta et al. |

(Continued)

FOREIGN PATENT DOCUMENTS

CN    1438533    8/2003

(Continued)

OTHER PUBLICATIONS

Rotem et al. "Analysis of Thermal Monitor Features of the Intel Pentium M Processor." Downloaded from http://www.cs.virginia.edu/-skedron/iacs/men.pdf on Mar. 7, 2007.

(Continued)

*Primary Examiner*—Chen Wen Jiang
(74) *Attorney, Agent, or Firm*—Gary R. Stanford; Richard K. Huffman; James W. Huffman

(57) ABSTRACT

A microprocessor temperature control system including a microprocessor with on-chip fan control logic, a fan, and temperature sense logic. The fan control logic receives temperature information and provides a variable fan control signal to cool the microprocessor. The fan is externally mounted to the microprocessor and has a control input that receives the variable fan control signal. The temperature sense logic provides the temperature information associated with the microprocessor. The fan control logic may be configured to vary rotational speed of the fan and to adjust operation of the fan to achieve an optimum blend of reliability, power consumption, and speed. In addition or in the alternative, the temperature sense logic is external to the microprocessor for providing the temperature information via an external interface. The fan control signal may be a variable output in digital format.

20 Claims, 2 Drawing Sheets

U.S. PATENT DOCUMENTS

| | | |
|---|---|---|
| 6,172,611 B1 * | 1/2001 | Hussain et al. ............ 340/584 |
| 6,233,691 B1 | 5/2001 | Atkinson |
| 6,259,293 B1 | 7/2001 | Hayase et al. |
| 6,384,733 B1 * | 5/2002 | Seesemann ................ 340/648 |
| 6,438,697 B2 | 8/2002 | Atkinson |
| 6,448,834 B2 | 9/2002 | Takaki |
| 6,487,668 B2 * | 11/2002 | Thomas et al. ............ 713/322 |
| 6,609,211 B2 | 8/2003 | Atkinson |
| 6,671,175 B1 | 12/2003 | Chen |
| 6,836,849 B2 | 12/2004 | Brock et al. |
| 7,006,943 B1 * | 2/2006 | Mitchell et al. ............ 702/132 |
| 7,017,061 B2 | 3/2006 | Lippert et al. |
| 7,019,577 B2 | 3/2006 | Agrawal et al. |
| 7,069,463 B2 | 6/2006 | Oh |
| 2002/0020755 A1 | 2/2002 | Matsushita Aki |
| 2005/0044429 A1 | 2/2005 | Gaskins et al. |
| 2005/0138444 A1 | 6/2005 | Gaskins et al. |
| 2005/0182983 A1 | 8/2005 | Gaskins et al. |

FOREIGN PATENT DOCUMENTS

| | | | |
|---|---|---|---|
| JP | 07209091 A | * | 8/1995 |
| TW | 0548534 B | | 8/2003 |
| TW | 573760 | | 1/2004 |

OTHER PUBLICATIONS

Intel 64 and IA-32 Architectures Software Developers's Manual. vol. 3A: System Programming Guide, Part 1. Nov. 2006. pp. 13-1, and 13-5 to 13-15.

Intel Pentium M Processor with 2-MB L2 Cache and 533-MHz Front Side Bus. Datasheet. Jul. 2005. pp. 14 and 62-64. Reference No. 305262-002.

Wireless Intel SpeedStep Power Manager. "Optimizing power consumption for the Intel PXA27x processor family." Intel. 2004. pp. 1-16.

"Enhanced Intel SpeedStep Technology for the Intel Pentium M Processor." Intel Mar. 2004. pp. 1-12.

* cited by examiner

METHOD AND APPARATUS FOR MICROPROCESSOR TEMPERATURE CONTROL

CROSS-REFERENCE TO RELATED APPLICATIONS

This application claims the benefit of U.S. Provisional Application No. 60/544,214, filed on Feb. 12, 2004, which is herein incorporated by reference for all intents and purposes.

BACKGROUND OF THE INVENTION

1. Field of the Invention

The present invention relates to microprocessor temperature control, and more particularly to providing precise temperature control of a microprocessor die during operation by allowing direct control of a fan mounted to the microprocessor case by logic within the microprocessor itself.

2. Description of the Related Art

Managing the temperature of computing systems is a challenge to present day designers. The microprocessor is usually the most critical component in a computing system from a thermal viewpoint. The operating temperature of microprocessor die is a significant contributor to the overall reliability of the computing system. The power consumed by the microprocessor is a function of its die temperature. In a desirable scenario, the operating temperature of a microprocessor is dynamically managed to achieve an optimum blend of reliability, power consumption, and speed.

Present day techniques for controlling microprocessor temperature are generally crude and do not support scenarios under which a microprocessor may function efficiently. Heat sinks may be coupled to the case of the microprocessor. Fans may be strategically placed to ensure sufficient airflow is provided to allow cooling of the device. In many applications today, microprocessor heat sinks are provided with integral fans that continuously run to provide for device cooling. More sophisticated systems may include various thermal sensing devices that allow for control of supplemental fans when extreme temperature conditions are detected. The various existing solutions are numerous, varied (non-standard), often difficult to implement, and usually inefficient.

SUMMARY OF THE INVENTION

A microprocessor with temperature control according to an embodiment of the present invention includes a microprocessor die with an external interface for externally providing a variable fan control signal, and fan control logic provided on the microprocessor die that provides the fan control signal based on temperature information associated with the microprocessor. The variable fan control signal is directly coupled to an external fan to directly control said external fan. The variable fan control signal may be operative to turn the external fan on and off or to variably control rotational speed of the external fan. The fan control logic adjusts operation of the external fan to achieve an optimum blend of reliabilitiy, power consumption, and speed of the microprocessor. The microprocessor may include temperature sense logic provided on the microprocessor die and coupled to the fan control logic for providing the temperature information. The temperature sense logic may include at least one temperature sensor placed on the microprocessor die. Alternatively, or in addition, the external interface may receive the temperature information from an external source, such as external temperature sense logic. The fan control signal may be a variable output in digital format.

A microprocessor temperature control system according to another embodiment of the present invention includes a microprocessor including on-chip fan control logic, a fan, and temperature sense logic. The fan control logic receives temperature information and provides a variable fan control signal to cool the microprocessor. The fan is externally mounted to the microprocessor and has a control input that is directly coupled to the variable fan control signal. The variable fan control signal is operative to directly control the fan. The temperature sense logic provides the temperature information associated with the microprocessor. The variable fan control signal may be a variable output in analog format. The fan control logic adjusts operation of the fan to achieve an optimum blend of reliability, power consumption, and speed of the microprocessor The fan control logic may be configured to turn the fan on and off or to vary rotational speed of the fan. The temperature sense logic may include at least one temperature sensitive device placed on the die of the microprocessor, such as a thermocouple or a thermal diode or any other suitable temperature measuring device. In addition or in the alternative, the temperature sense logic may be external to the microprocessor in which it provides the temperature information via an external interface of the microprocessor.

A method of controlling temperature of a microprocessor according to an embodiment of the present invention includes sensing temperature associated with the microprocessor, determining, by the microprocessor, a fan control parameter for controlling an externally mounted fan for cooling the microprocessor, and providing, by the microprocessor, a variable fan control signal indicative of the fan control parameter for variably controlling the fan. The providing includes adjusting operation of the externally mounted fan to achieve an optimum blend of reliability, power consumption, and speed of the microprocessor.

The method may include turning the fan on and off or varying rotational speed of the fan using the variable fan control signal. The method may include measuring temperature using a temperature sensor mounted to the die of the microprocessor. The method may include externally measuring temperature and providing externally measured temperature information to the microprocessor via an external interface. The method may include basing the fan control parameter, in addition, upon current operating conditions of the microprocessor.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need for controlling the temperature of the microprocessor die to enable the microprocessor to function as efficiently as possible. They have therefore developed an apparatus and method for allowing the microprocessor itself to control a fan coupled to the microprocessor case to obtain an optimum mix of power consumption, speed, and reliability, as will be further described below with respect to FIGS. 1 and 2.

Figure 1:
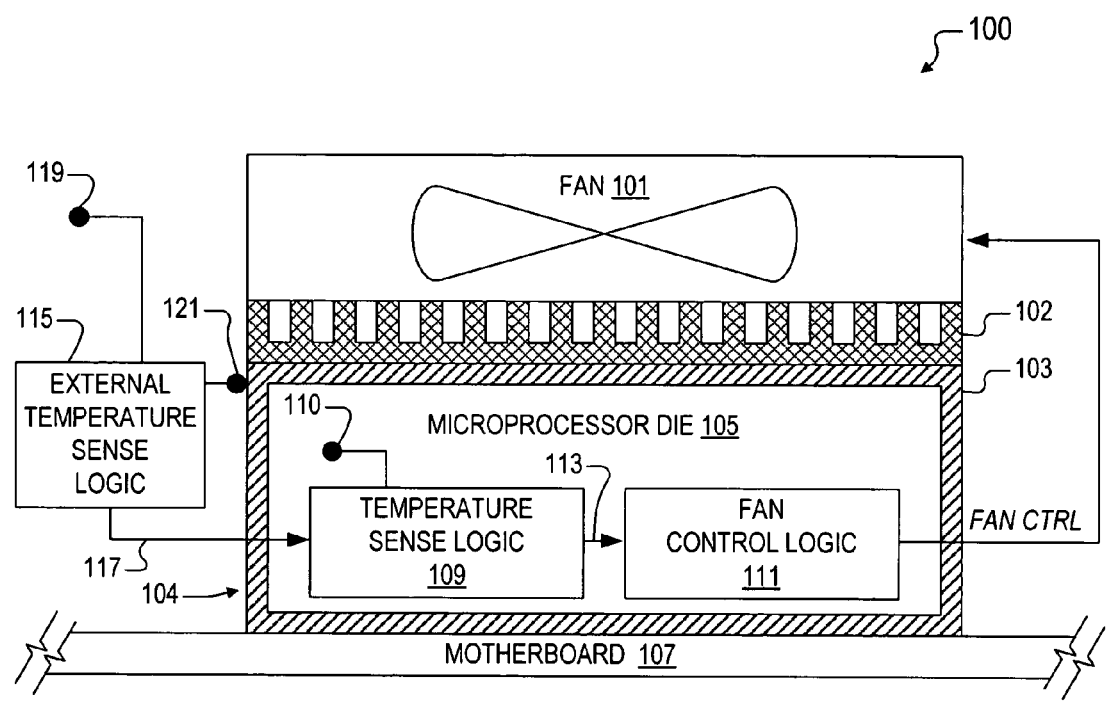
FIG. 1 is a block diagram illustrating a microprocessor temperature control system implemented according to an exemplary embodiment of the present invention.

FIG. 1 is a block diagram illustrating a microprocessor temperature control system 100 implemented according to an exemplary embodiment of the present invention. The microprocessor temperature control system 100 includes a cooling fan 101 and heat sink 102 mounted to a microprocessor 104, which includes a case 103 containing a microprocessor die 105. The heat sink 102 is optional but is typically provided for modern microprocessors for maximal dissipation of heat generated by the microprocessor die 105. The case 103 is in turn mounted to a motherboard 107 in a mounting configuration that is typical of production schemes prevalent in the industry today. In contrast to present day methods for cooling, however, the microprocessor 104 includes internal fan control logic 111 for controlling operation of the fan 101. The fan control logic 111 comprises logic, circuits, devices, or microcode, or a combination of logic, circuits, devices, or microcode, or equivalent elements that are employed to perform an fan control functions as described herein. The elements employed to perform the fan control functions may be shared with other circuits, microcode, etc., that are employed to perform other functions within the microprocessor 104. According to the scope of the present application, microcode is a term employed to refer to one or more micro instructions. A micro instruction (also referred to as a native instruction) is an instruction at the level that a functional unit such as the fan control logic 111 executes. For example, micro instructions are directly executed by a reduced instruction set computer (RISC) microprocessor. For a complex instruction set computer (CISC) microprocessor such as an x86-compatible microprocessor 107, x86 instructions are translated into associated micro instructions, and the associated micro instructions are directly executed by one or more functional units the CISC microprocessor. In the embodiment shown, the microprocessor 104 further includes internal temperature sense logic 109, which is configured to determine the temperature of the microprocessor die 105 and to provide corresponding temperature information to the fan control logic 111 via signal lines 113. The term "temperature information" encompasses any known method of conveying one or more measured temperatures, such as analog values (voltage or current signals), digital values, etc. In addition, or in the alternative, external temperature sense logic 115 is provided and coupled to the microprocessor 104 via any appropriate microprocessor interface 117 for conveying temperature information. It is noted that the fan control logic 111 employs temperature information detected by the temperature sense logic 109, the external temperature sense logic 115, or a combination of both.

The temperature sense logic 109 includes or is otherwise interfaced with one or more internal temperature measuring devices or sensors, as represented by an internal temperature sensor 110. Each temperature sensor 110 may be configured in any suitable manner, such as, for example, a thermocouple, a thermistor, a thermal diode, a thermomagnetic device, etc. In one embodiment, the temperature sense logic 109 employs one or more temperature sensors 110 placed strategically on the microprocessor die 105 and includes circuitry or logic for measuring or otherwise detecting temperature values. In one embodiment, the external temperature sense logic 115 is configured in a similar manner as the temperature sense logic 109 and includes or is otherwise interfaced with one or more temperature sensors 119, 121. The temperature sensors 119, 121 are also implemented in any suitable manner, such as thermocouples, thermistors, thermal diodes, thermomagnetic devices, etc. The external temperature sense logic 115 may be used for measuring microprocessor temperature, such as illustrated by the temperature sensor 121 mounted to or otherwise located near the microprocessor case 103. The external temperature sense logic 115 may be used for measuring ambient temperature, such as illustrated by the temperature sensor 119. The external temperature sense logic 115 is implemented in any suitable manner to convey temperature information from external sensors to the temperature sense logic 109, which conveys the information to the fan control logic 111. Alternatively, the external temperature sense logic 115 may be directly interfaced to the fan control logic 111. The microprocessor interface 117 may include one or more microprocessor pins, or may be implemented in any other suitable manner for conveying temperature information as known to those skilled in the art.

The fan control logic 111 receives the internal and/or external temperature information and provides a fan control (FAN CTRL) output that controls the fan 101. In one embodiment, the fan control logic 111 provides a variable output, such as a variable signal in analog or digital format, that controls the rotational speed of the fan 101. In an alternative embodiment, the FAN CTRL output includes a binary power signal or the like (e.g., digital bit, analog voltage, etc.) that enables the fan control logic 111 to turn the fan 101 on and off. In the embodiment illustrated, the FAN CTRL is shown as a unidirectional output in which the fan 101 is simply commanded to turn on or off or to rotate at a specified speed. In an alternative embodiment, the FAN CTRL signal is bi-directional for more accurate control of fan speed and/or verification that the fan 101 is operating correctly.

Figure 2:
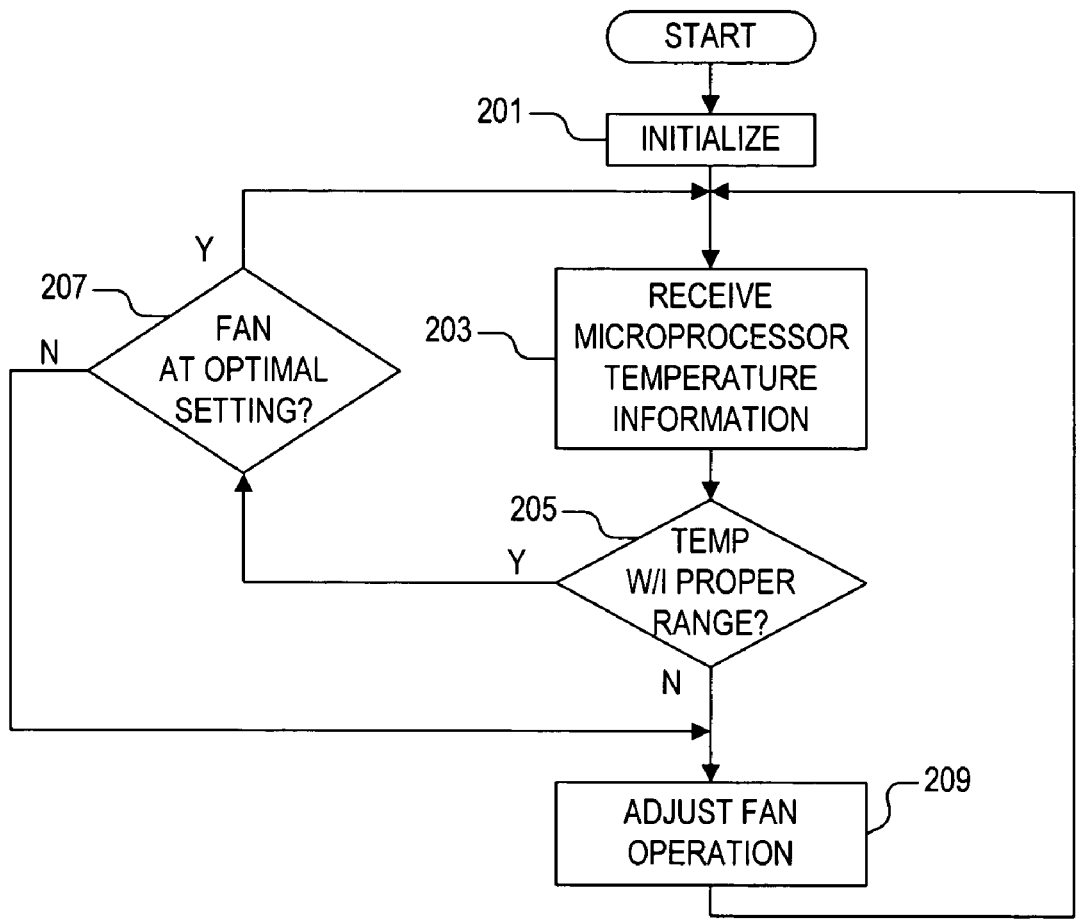
FIG. 2 is a flowchart diagram illustrating operation of the fan control logic of FIG. 1 according to an exemplary embodiment of the present invention.

FIG. 2 is a flowchart diagram illustrating operation of the fan control logic 111 according to an exemplary embodiment of the present invention. Operation of the fan control logic 111 is initialized at a first block 201, such as, for example, resetting registers, clearing flags, placing the fan 101 in an initial known state, etc. Operation proceeds to block 203 at which the fan control logic 111 receives temperature information of the microprocessor 104, such as from either or both the internal and external temperature sense logic 109, 115 depending upon the particular configuration. Temperature information may be provided in any format, such as values read from one or bits of one or more registers (not shown) as known to those skilled in the art.

Operation proceeds to query block 205, in which it is determined whether the temperature information is within the desired operating range(s). If so, operation proceeds to block 207 at which it is determined whether the fan 101 is operating at an optimal setting. Although the fan control logic 111 may be implemented to operate by reading static temperature values, it is understood by those skilled in the art that more sophisticated schemes may be implemented, such as algorithms that monitor and, track temperature over time and that determine temperature changes and/or rate of temperature change. For example, even if the current temperature of the microprocessor 104 is within the desired range as determined at block 205, it may also be determined that the temperature is quickly increasing as a result of a recent increase in power level (e.g., increase in microprocessor clock speed and/or voltage) and that the fan 101 should be turned on or that its rotational speed should be increased. Or, it may be determined at block 207 that the fan 101 may be turned off or that its rotational speed should be reduced given the current operating conditions of the microprocessor 104. For example, the clock speed and/or voltage of the microprocessor 104 may have been recently reduced and the fan 101 can be turned off or turned down. If the present setting of the fan 101 is optimal, operation returns to block 203 to update the temperature information.

If the temperature information is not within the desired operation range(s) as determined at block 205, or if the fan 101 is not at an optimal setting as determined at block 207, then operation proceeds to block 209 in which the operation of the fan 101 is adjusted. As previously described, the fan 101 may be turned on or off or its rotational speed may be adjusted depending upon the particular implementation. Operation then loops back to block 203 to update the temperature information. The exemplary flowchart diagram illustrates that the fan control logic 111 continuously (or periodically) receives temperature information and adjusts operation of the fan 101 to achieve an optimum blend of reliability, power consumption, and speed of the microprocessor 104.

Although the present invention has been described in considerable detail with reference to certain preferred versions thereof, other versions and variations are possible and contemplated. For example, although the present invention is illustrated for use with microprocessors, other circuit devices and components are contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A microprocessor with temperature control, comprising:
   a microprocessor die with an external interface for externally providing a variable fan control signal; and
   fan control logic, provided on said microprocessor die, that provides said variable fan control signal based on temperature information associated with the microprocessor, wherein said variable fan control signal is directly coupled to an external fan to directly control said external fan, and wherein said fan control signal is operative to variably control rotational speed of said external fan, and wherein said fan control logic adjusts operation of said external fan to achieve an optimum blend of reliability, power consumption, and speed of the microprocessor.

2. The microprocessor of claim 1, wherein said fan control signal is operative to turn said external fan on and off.

3. The microprocessor of claim 1, wherein said fan control signal comprises a variable output in digital format.

4. The microprocessor of claim 1, further comprising temperature sense logic, provided on said microprocessor die and coupled to said fan control logic, that provides said temperature information.

5. The microprocessor of claim 4, wherein said temperature sense logic comprises at least one temperature sensor placed on said microprocessor die.

6. The microprocessor of claim 1, wherein said external interface receives said temperature information from an external source.

7. A microprocessor temperature control system, comprising:
   a microprocessor including on-chip fan control logic that receives temperature information and that provides a variable fan control signal to cool said microprocessor;
   a fan, externally mounted to said microprocessor, having a control input directly coupled to said variable fan control signal, wherein said variable fan control signal is operative to directly control said fan, and wherein said fan control logic varies rotational speed of said fan, and wherein said fan control logic adjusts operation of said fan to achieve an optimum blend of reliability, power consumption, and speed of said microprocessor; and
   temperature sense logic that provides said temperature information associated with said microprocessor.

8. The microprocessor temperature control system of claim 7, wherein said fan control logic turns said fan on and off.

9. The microprocessor temperature control system of claim 7, wherein said variable fan control signal comprises a variable output in analog format.

10. The microprocessor temperature control system of claim 7, wherein said temperature sense logic comprises at least one temperature sensitive device placed on the die of said microprocessor.

11. The microprocessor temperature control system of claim 10, wherein said at least one temperature sensitive device comprises a thermocouple.

12. The microprocessor temperature control system of claim 10, wherein said at least one temperature sensitive device comprises a thermal diode.

13. The microprocessor temperature control system of claim 7, wherein said temperature sense logic is provided on-chip of said microprocessor.

14. The microprocessor temperature control system of claim 7, wherein said temperature sense logic is external to said microprocessor and provides said temperature information via an external interface.

15. A method of controlling temperature of a microprocessor, comprising:
   sensing temperature associated with the microprocessor;
   determining, by the microprocessor, a fan control parameter for controlling an externally mounted fan for cooling the microprocessor;
   providing, by the microprocessor, a variable fan control signal indicative of the fan control parameter for variably controlling the fan, wherein said providing comprises:
      adjusting operation of the externally mounted fan to achieve an optimum blend of reliability, power consumption, and speed of the microprocessor; and
   varying rotational speed of the fan using the variable fan control signal.

16. The method of claim 15, further comprising turning the fan on and off using the variable fan control signal.

17. The method of claim 15, wherein said determining comprises:
    basing the fan control parameter, in addition, upon current operating conditions of the microprocessor.

18. The method of claim 15, wherein said sensing temperature comprises measuring temperature using a temperature sensor mounted to the die of the microprocessor.

19. The method of claim 15, wherein said sensing temperature comprises measuring temperature externally to the microprocessor.

20. The method of claim 19, further comprising providing externally measured temperature information to the microprocessor via an external interface.

* * * * *